(12) United States Patent
Umlauft et al.

(10) Patent No.: US 9,056,685 B2
(45) Date of Patent: Jun. 16, 2015

(54) METHOD AND SYSTEM FOR MOUNTING INTERIOR COMPONENTS IN AN AIRCRAFT

(75) Inventors: Sebastian Umlauft, Hamburg (DE); Niklas Halfmann, Hamburg (DE); Dieter Krause, Buchholz (DE)

(73) Assignee: Airbus Operations GmbH (DE)

( * ) Notice: Subject to any disclaimer, the term of this patent is extended or adjusted under 35 U.S.C. 154(b) by 552 days.

(21) Appl. No.: 13/375,146

(22) PCT Filed: Apr. 29, 2010

(86) PCT No.: PCT/EP2010/002641
§ 371 (c)(1),
(2), (4) Date: Feb. 21, 2012

(87) PCT Pub. No.: WO2010/136103
PCT Pub. Date: Dec. 2, 2010

(65) Prior Publication Data
US 2012/0137487 A1    Jun. 7, 2012

Related U.S. Application Data

(60) Provisional application No. 61/182,304, filed on May 29, 2009.

(30) Foreign Application Priority Data

May 29, 2009    (DE) .......................... 10 2009 023 391

(51) Int. Cl.
*B64C 1/00*    (2006.01)
*B64F 5/00*    (2006.01)
*B64D 11/00*    (2006.01)

(52) U.S. Cl.
CPC ......... *B64F 5/0009* (2013.01); *Y10T 29/49831* (2013.01); *Y10T 29/53417* (2013.01); *Y10T29/53022* (2013.01); *Y10T 29/49828* (2013.01); *Y10T 29/49764* (2013.01); *B64D 2011/0046* (2013.01)

(58) Field of Classification Search
CPC ........ B23P 19/04; B23Q 3/186; B62D 65/02; B62D 65/026; B23K 37/0426–37/0443; B25B 11/02
USPC ................... 29/428, 407.01, 897.2, 464–469, 29/281.1–281.6; 269/1; 244/118.5; 248/205.1
See application file for complete search history.

(56) References Cited

U.S. PATENT DOCUMENTS 6,073,987 A * 6/2000 Lindberg et al. ................. 296/70
7,270,297 B2 * 9/2007 Schaefer et al. ........... 244/137.1

(Continued)

FOREIGN PATENT DOCUMENTS

| DE | 102006034862 A1 | 1/2008 |
| DE | 102007050422 A1 | 4/2009 |
| WO | 2010/018092 A2 | 2/2010 |

OTHER PUBLICATIONS

International Search Report and Written Opinion established by the ISA/EP on Sep. 21, 2010 in connection with PCT/EP2010/002641.

*Primary Examiner* — David Bryant
*Assistant Examiner* — Jun Yoo
(74) *Attorney, Agent, or Firm* — Barnes & Thornburg LLP (57) ABSTRACT

A method for mounting interior components in an aircraft includes premounting a first interior component and premounting a second interior component. At least one of the first and the second interior component is secured to a mounting device and the first and second interior components are connected to form an individual module. A plurality of individual modules secured to the mounting device are interconnected to form a large module which is secured to the mounting device. The large module is detached from the mounting device and transported to a final-mounting position in an aircraft fuselage element. The detached large module is then mounted in the aircraft fuselage element.

10 Claims, 3 Drawing Sheets

(56) References Cited

U.S. PATENT DOCUMENTS

| | | | |
|---|---|---|---|
| 8,474,758 B2* | 7/2013 | Koefinger et al. | 244/120 |
| 2009/0250554 A1* | 10/2009 | Graeber et al. | 244/120 |
| 2011/0138603 A1* | 6/2011 | Blees et al. | 29/429 |

* cited by examiner

METHOD AND SYSTEM FOR MOUNTING INTERIOR COMPONENTS IN AN AIRCRAFT

CROSS-REFERENCE TO RELATED APPLICATIONS

This application is the U.S. national phase of PCT/EP2010/002641 filed Apr. 29, 2010. PCT/EP2010/002641 claims the benefit under the Convention of German Patent Application No. 102009023391.1 and U.S. Provisional Patent Application No. 61/182,304 both filed on May 29, 2009.

FIELD OF THE INVENTION

The invention relates to a method and a system for mounting interior components in an aircraft.

BACKGROUND

On the mounting of interior components in an aircraft, it is customary at present to connect components, such as, for example, dado panels, side coverings, ceiling coverings, light strips, luggage compartments and the like, individually to the aircraft structure. Since each component has to be separately positioned and fastened to the aircraft structure, the mounting of these components is very time-consuming. Similarly, for example, pipelines serving as air-conducting lines of an aircraft air-conditioning system or for water supply in an aircraft cabin, and also electric lines, are at present also fastened individually to the aircraft structure in a time-consuming manner. After mounting, the proper functioning of all the lines must be checked in a final inspection. In particular, all the pipelines have to undergo a tightness check, while in the case of the electric lines it is necessary to check all the interfaces. These tests are likewise relatively onerous, since the lines and interfaces to be checked are often accessible only with difficulty in the mounted state.

SUMMARY

The object on which the invention is based is to provide a method and a system which enable efficient mounting of interior components in an aircraft.

To achieve this object, a method for mounting interior components in an aircraft according to the invention comprises the preassembling of a first interior component. The first interior component can, for example, be an overhead luggage compartment or a side covering panel of the cabin interior fittings of the aircraft. Further, in the mounting method according to the invention, a second interior component is preassembled. Like the first interior component, the second interior component can also be an overhead luggage compartment or a side covering panel. Preferably, in the mounting method according to the invention, an overhead luggage compartment is used as the first interior component and a side covering panel as the second interior component.

In the mounting method according to the invention, the preassembled first interior component can be fastened to an assembly apparatus and subsequently connected to the second interior component to form an individual module. Alternatively to this, however, the second interior component can also be fastened to an assembly apparatus and subsequently connected to the first interior component to form an individual module. Further, the first and the second interior component can firstly be connected to form an individual module and subsequently one or both interior component(s) can be fastened to the assembly apparatus. In principle, it is possible to fasten just one of the two interior components to the assembly apparatus. There is then no direct connection between one interior component and the assembly apparatus. If, however, this is desired or required to increase the stability of the individual module, both the first and the second interior component can also be fastened to the assembly apparatus.

The above-described method steps—preassembling a first interior component, preassembling a second interior component and producing an individual module—can be repeated until a desired number of individual modules are fastened to the assembly apparatus. The individual modules fastened to the assembly apparatus are subsequently connected to form a large module fastened to the assembly apparatus. A large module can comprise, for example, three individual modules which, for their part, each comprise an overhead luggage compartment and a side covering panel. If desired or required, however, the large module can also have any other number of individual modules. The final configuration of the large module can, for example, be dependent on parameters, such as for example the weight and volume of the individual components of the large module and consequently the handleability of the large module in its preassembled state.

The preassembled large module is finally detached from the assembly apparatus and transported in the preassembled state into a final-mounting position in an aircraft fuselage element. The aircraft fuselage element can, for example, be a fuselage shell open at least one end side. Alternatively to this, however, the large module can also be brought into an aircraft fuselage which is almost completely or is completely constructed. All that is essential is for the aircraft fuselage element to have an access which enables the large module to be brought into its final-mounting position in the aircraft fuselage element. To facilitate the transporting of the large module into its final-mounting position in the aircraft fuselage element, individual components of the large module, such as for example the individual modules, but also the interior components of the individual modules are movable relative to one another in such a way that the volume of the large module on transporting it into its final-mounting position in the aircraft fuselage element can be reduced.

In the final step of the method for mounting interior components in the aircraft according to the invention, the large module is final-mounted in the aircraft fuselage element. On the final mounting, the large module can be fastened to the aircraft structure at defined fastening points, for example by means of corresponding fastening devices.

The method for mounting interior components in an aircraft according to the invention has the advantage that a large number of assembly steps can be conveniently carried out outside the aircraft. As a result, the interior component mounting can be made significantly easier. This may also enable an increase in quality, since it is possible, for example, to compensate for tolerances of the components of the large module more easily on preassembly of the large module outside the aircraft. Finally, the method according to the invention enables assembly steps to be performed in parallel. For example, a plurality of large modules can be preassembled in parallel in a simple manner. As a result, the assembly process as a whole can be made more efficient.

In the method for mounting interior components in an aircraft according to the invention, provision may be made for line assembly of large modules, i.e. large modules can be sequentially preassembled, transported into their final-mounting position in the aircraft fuselage element and final-mounted in the aircraft fuselage element. Such a procedure has the advantage that individual assembly stations employed in the line assembly of the large modules have merely a small range of operations to cope with and can therefore be specifically adapted to the tasks demanded of them. However, a disruption at an individual assembly station can result in time delays at following stations. Moreover, a line assembly process is comparatively inflexible and limited in its capacity.

Alternatively to this, in the mounting method according to the invention, a plurality of large modules fastened to the assembly apparatus and/or a plurality of individual modules fastened to the assembly apparatus can be connected to form a cabin structure fastened to the assembly apparatus. The cabin structure can have a varying extent, as required. For example, the cabin structure can comprise some or all of the first and second interior components to be installed in the aircraft, i.e. some or all of the individual modules or large modules to be installed in the aircraft. In other words, the mounting method according to the invention can be used to realise an external cabin assembly, in which large parts of an aircraft cabin are preassembled outside the aircraft. In such a configuration of the method according to the invention, preferably a plurality of large modules are assembled in parallel. Workstations responsible for the assembly of the large modules here each perform all the assembly operations required to complete the large modules. Such a configuration of the mounting method according to the invention makes it possible to realise a very clear assembly process and a clear configuration of the large modules with customised components. Moreover, such an assembly process is distinguished by high flexibility. The disadvantage, however, is the high space requirement.

In the method for mounting interior components in an aircraft according to the invention, an assembly apparatus configured in the form of an assembly frame can be employed. For example, the assembly apparatus can comprise a plurality of U-shaped carriers arranged substantially parallel to one another, with two vertical supporting struts and one horizontal strut connecting the vertical supporting struts to one another. The carriers can be connected to one another by two horizontally running holding struts which can be fastened to the horizontal struts of the carriers. Moreover, the assembly apparatus can comprise one or more guiding device(s), with the aid of which components to be installed and/or assembly tools can be positioned as desired.

Preferably, in the mounting method according to the invention, on connecting a plurality of individual modules fastened to the assembly apparatus to form a large module fastened to the assembly apparatus, at least one individual module is displaced horizontally relative to the assembly apparatus. Similarly, on connecting a plurality of large modules fastened to the assembly apparatus to form a cabin structure fastened to the assembly apparatus, at least one large module is displaced horizontally relative to the assembly apparatus. Such a configuration of the mounting method according to the invention enables the parallel preassembly of a plurality of individual modules or large modules and subsequently a simple connection of these individual modules or large modules to form a large module and a cabin structure, respectively. In order to enable a horizontal relative displacement of an individual module or a large module to the assembly apparatus, the first and/or the second interior component can be fastened horizontally displaceably on the assembly apparatus on the individual module preassembly. For example, the individual and/or large modules can be displaced horizontally on a holding strut of the assembly apparatus.

In the mounting method according to the invention, only first and second interior components, i.e. for example overhead luggage compartments and side covering panels, can be preassembled outside the aircraft fuselage element. It is, however, also possible to connect further interior components to an individual module fastened to the assembly apparatus, to a large module fastened to the assembly apparatus and/or to a cabin structure fastened to the assembly apparatus. For example, electric lines, air-conducting lines of an aircraft air-conditioning system or pipelines serving for water supply in the aircraft cabin can be connected to an individual module fastened to the assembly apparatus, to a large module fastened to the assembly apparatus and/or to a cabin structure fastened to the assembly apparatus. Further, personal service units, personal service channels and individual parts of the aircraft galleys, which can optionally already be preassembled, like the first and the second interior component, can be integrated into the mounting method according to the invention and be connected to an individual module fastened to the assembly apparatus, to a large module fastened to the assembly apparatus and/or to a cabin structure fastened to the assembly apparatus.

In a preferred embodiment of method for mounting interior components in an aircraft according to the invention, an individual module fastened to the assembly apparatus, a large module fastened to the assembly apparatus and/or a cabin structure fastened to the assembly apparatus is/are tested. The test can comprise manual tests, visual checks and quality assurance measures, such as for example testing of surfaces, but also functional tests of mechanical and electrical or electronic components. For example, lines of the aircraft air-conditioning system and/or of the water supply system of the aircraft which are installed in the individual module, the large module or the cabin structure can be checked for tightness. Further, it is conceivable to perform functional tests on electric lines or interfaces integrated into the individual module, the large module or the cabin structure, optionally also using a simulation system for simulating specific test conditions or events.

As a rule, it is significantly easier to carry out tests on an individual module, a large module or a cabin structure in the state of the individual module, the large module or the cabin structure when fastened to the assembly apparatus than in the state of these components when mounted in the aircraft fuselage element. In particular, the individual module, the large module or the cabin structure and individual parts of these components are significantly more easily accessible in the state of the individual module, the large module or the cabin structure when fastened to the assembly apparatus than in the final-mounted state in the aircraft fuselage element. In the context of the mounting method according to the invention, increasingly comprehensive tests can be carried out, the more components are connected before the tests to an individual module to be tested, to a large module to be tested or to a cabin structure to be tested. Therefore, in particular the connection of a plurality of large modules to form a cabin structure as complete as possible is appropriate if comprehensive tests are to be carried out on the cabin structure, for example on air-conducting lines, water-conducting lines or electric lines and interfaces.

If, in the context of the mounting method according to the invention, only large modules are preassembled, the large modules can be transported into their final-mounting position in the aircraft fuselage element directly after completion of the tests to be carried out on the large modules and final-mounted in the aircraft fuselage element. If, by contrast, in the context of the mounting method according to the invention, a plurality of large modules and/or individual modules are connected to form a cabin structure fastened to the assembly apparatus, for example to carry out comprehensive tests on the cabin structure, then after the testing of the cabin structure, the large modules of the cabin structure connected to one another are separated from one another and transported individually into their final-mounting position in the aircraft fuselage element. As a result, the use of a transporting apparatus suitable for transporting a large-volume cabin structure can be dispensed with.

In the method for mounting interior components in an aircraft according to the invention, the individual module, the large module and/or the cabin structure is/are fastened to the assembly apparatus preferably in a position which corresponds substantially to the position which the individual module, the large module and/or the cabin structure assumes/assume in the final-mounted state in the aircraft fuselage element. Further, the large module is transported to the aircraft fuselage element preferably in a position which corresponds substantially to the position which the large module assumes in the final-mounted state in the aircraft fuselage element. As a result of such a configuration of the mounting method according to the invention, complicated repositioning of the large module for the transporting and final mounting in the aircraft fuselage element can be dispensed with. Moreover, a positioning of the individual module, the large module or the cabin structure in the assembly apparatus in a position close to the final-mounting position enables realistic testing to be carried out. For example, it can thereby be easily and reliably checked whether individual components of the individual module, the large module and/or the cabin structure are correctly positioned relative to one another.

In principle, it is possible to transport the large module manually into its final-mounting position in the aircraft fuselage element. Preferably, however, the large module is transported into its final-mounting position in the aircraft fuselage element with the aid of a transporting carriage. When the large module has reached its final-mounting position in the aircraft fuselage element, it can initially remain on the transporting carriage and be fastened to the structure of the aircraft fuselage element, for example to frames of the aircraft fuselage element structure, in the state in which it is held on the transporting carriage. Preferably, uncoupling of the large module from the transporting carriage takes place only when the large module is at least provisionally fastened to the structure of the aircraft fuselage element. After fastening the large module to the structure of the aircraft fuselage element, the transporting carriage can be removed from the aircraft fuselage element.

The horizontal and/or vertical position of the large module in its final-mounting position in the aircraft fuselage element is finely adjusted preferably with the aid of the transporting carriage. For example, the transporting carriage can be provided with a device or a plurality of devices which enables/enable fine adjustment of the horizontal and/or vertical position of the large module relative to the structure of the aircraft fuselage element. For example, the transporting carriage can be provided with a lifting apparatus for adjusting the vertical position of the large module. Further, the transporting carriage can be provided to cooperate with a guiding device which enables adjustment of the horizontal position of the large module relative to the structure of the aircraft fuselage element.

A system for mounting interior components in an aircraft according to the invention comprises a station for preassembling a first interior component and a station for preassembling a second interior component. Further, a station for fastening the first and/or the second interior component to an assembly apparatus, a station for connecting the first and the second interior component to form an individual module, a station for connecting a plurality of individual modules fastened to the assembly apparatus to form a large module fastened to the assembly apparatus, a station for detaching the large module from the assembly apparatus, a device for transporting the large module into a final-mounting position in an aircraft fuselage element, and a station for final-mounting of the large module in the aircraft fuselage element are provided. The individual stations of the mounting system according to the invention can be designed as stations spatially separated from one another. Alternatively to this, however, it is also possible for a plurality of stations for performing individual assembly steps to be spatially integrated into a common assembly area.

The mounting system according to the invention preferably further comprises a station for connecting a plurality of large modules fastened to the assembly apparatus to form a cabin structure fastened to the assembly apparatus.

Further, the mounting system can comprise a station for connecting further interior components to an individual module fastened to the assembly apparatus, to a large module fastened to the assembly apparatus and/or to a cabin structure fastened to the assembly apparatus.

A preferred embodiment of the system for mounting interior components according to the invention further comprises a station for testing an individual module fastened to the assembly apparatus, a large module fastened to the assembly apparatus and/or a cabin structure fastened to the assembly apparatus. This testing station can be equipped with all the required testing equipment, including a simulation system for simulating specific test conditions and/or events.

The assembly apparatus of the mounting system according to the invention is preferably designed such that the individual module, the large module and/or the cabin structure can be fastened to the assembly apparatus in a position which corresponds substantially to the position which the individual module, the large module and/or the cabin structure assumes/assume in the final-mounted state in the aircraft fuselage element.

Further, the mounting system according to the invention preferably comprises a transporting carriage for transporting the large module into its final-mounting position in the aircraft fuselage element. The transporting carriage can be designed such that the large module can be transported to the aircraft fuselage element in a position which corresponds substantially to the position which the large module assumes in the final-mounted state in the aircraft fuselage element. Further, the transporting carriage can comprise one or more devices for fine adjustment of the horizontal and/or the vertical position of the large module in its final-mounting position in the aircraft fuselage element.

BRIEF DESCRIPTION OF DRAWINGS

A preferred embodiment of the invention will now be explained in more detail with the aid of the appended schematic drawings, of which.

DETAILED DESCRIPTION OF DRAWINGS

Figure 1:
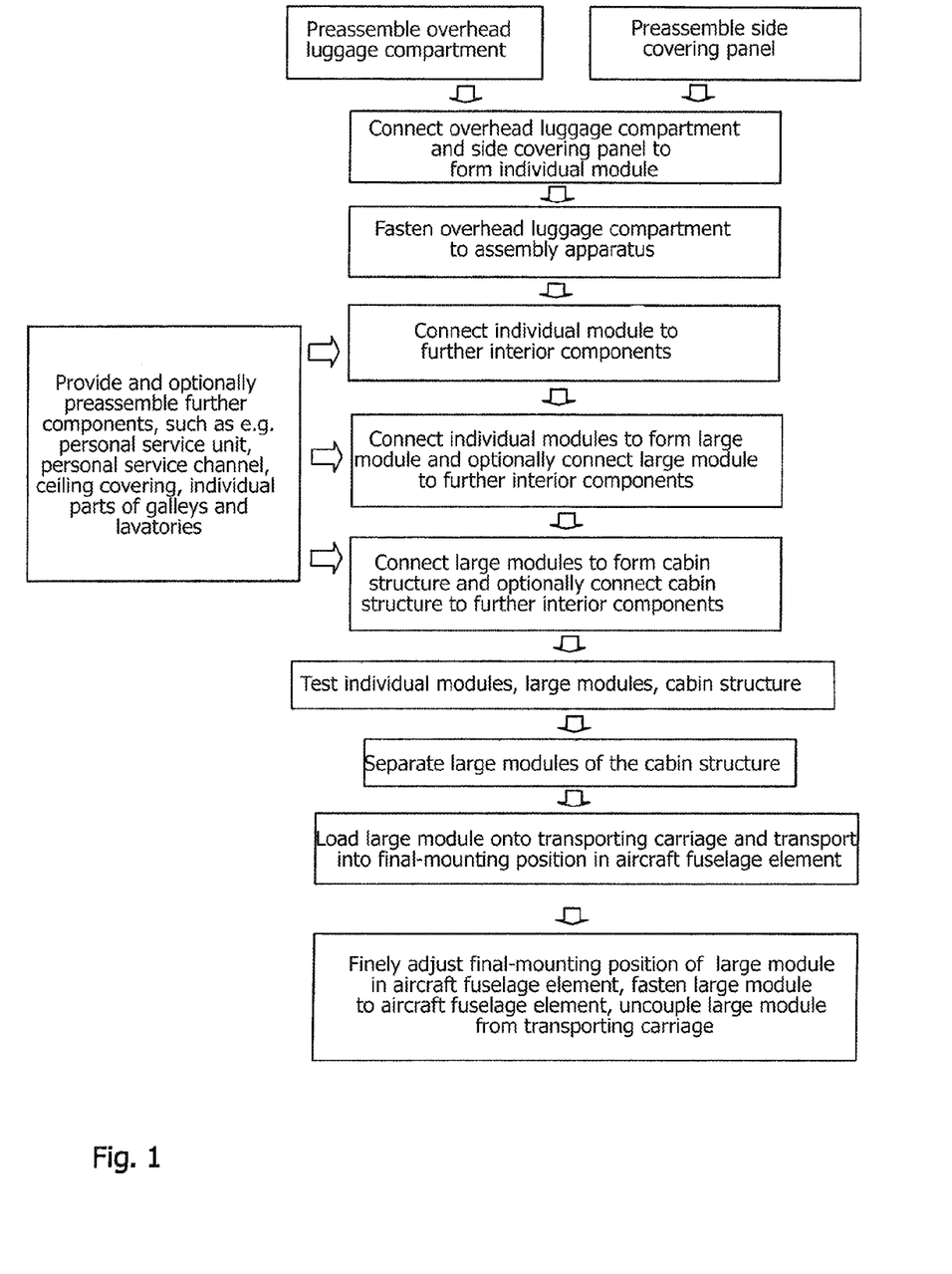
FIG. 1 shows a flow chart of a method for mounting interior components in an aircraft.
Figure 2:
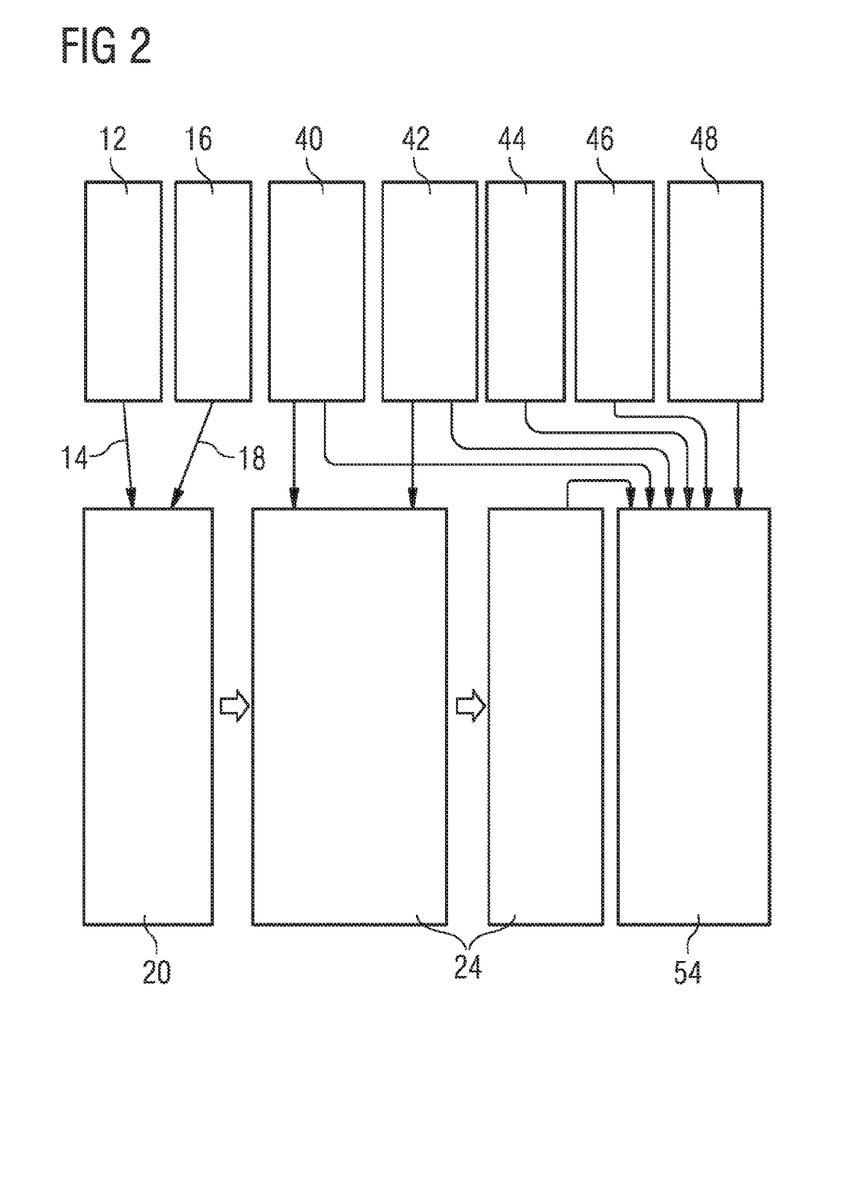
FIG. 2 shows a layout of a system for mounting interior components in an aircraft.
Figure 3:
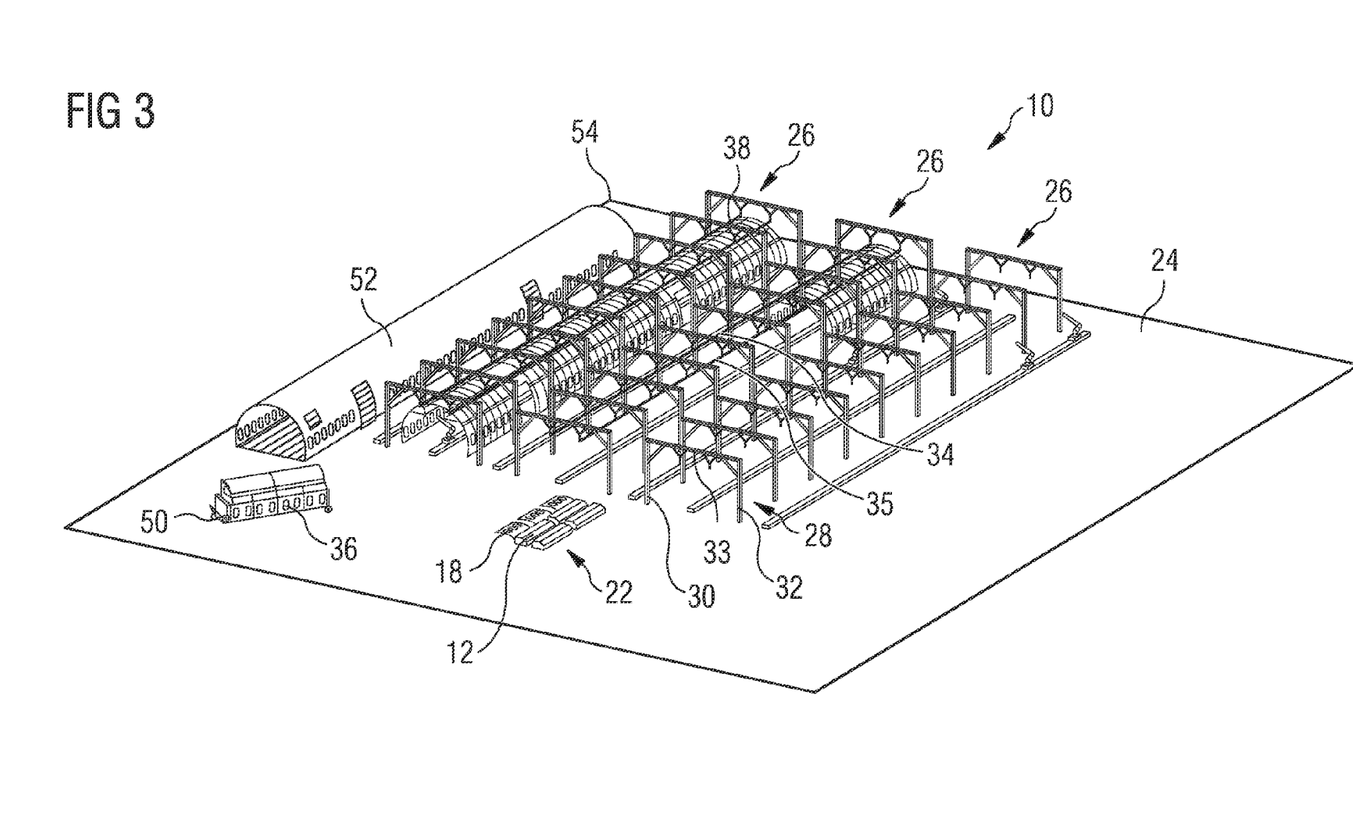
FIG. 3 shows a three-dimensional illustration of part of a system for mounting interior components in an aircraft.

A method and a system 10 for mounting interior components in an aircraft are shown in FIGS. 1 to 3. As can best be seen in FIG. 2, the system 10 comprises a station 12 for preassembling a first interior component 14. The first interior component 14 is in the form of an overhead luggage compartment (see FIG. 2). Further, the system 10 comprises a station 16, spatially separated from the station 12, for preassembling a second interior component 18. The second interior component 18 is in the form of a side covering panel of an aircraft cabin covering (see FIGS. 2 and 3).

A parallel preassembly of the first interior component 14 and the second interior component 18 can take place in the stations 12 and 16. The first interior component 14 and the second interior component 18 are connected in an individual module preassembly station 20 to form an individual module 22. It is understood that the individual module preassembly station 20 allows the parallel preassembly of a plurality of individual modules 22.

In a cabin preassembly and testing station 24, the first interior component 14, i.e. the overhead luggage compartment of each individual module 22 and hence the individual module 22 as a whole is fastened to an assembly apparatus 26, illustrated in FIG. 3. The assembly apparatus 26 comprises an assembly frame with a plurality of carriers 28 arranged substantially parallel to one another. Each carrier 28 has two vertical supports 30, 32 and one horizontal support 33 connecting the vertical supports 30, 32 to one another. The carriers 28 are connected to one another by two horizontally running holding struts 34, 35. On fastening an individual module 22 to the assembly apparatus 26, the first interior component 14 in the form of an overhead luggage compartment is attached horizontally displaceably to a holding strut 34, 35 of the assembly apparatus 26. If desired, the second interior component 18 can also be fastened at least temporarily to the assembly apparatus 26 to stabilise the individual module 22. For example, the second interior component 18 can be fastened to a vertical support 30, 32 of a carrier 28 of the assembly apparatus 26.

In the embodiment of a method and a system 10 for mounting interior components in an aircraft illustrated in FIGS. 1 to 3, the first interior component 14 and the second interior component 18 are connected to form an individual module 22 before the first interior component 14 and hence the individual module 22 is fastened to the assembly apparatus 26. If desired, the order of these assembly steps can also be reversed, i.e. the first interior component 14 can be fastened to the assembly apparatus 26 before it is connected to the second interior component 18 to form an individual module 22. Further, the individual module 22 can be fastened to the assembly apparatus 26 by fastening the second interior component 18 to the assembly apparatus 26 instead of the first interior component 14. In this case, too, the individual module preassembly can be performed before or after the second interior component 18 is fastened to the assembly apparatus 26.

In the cabin preassembly and testing station 24, further, a plurality of individual modules 22 fastened to the assembly apparatus 26 are connected to form a large module 36 fastened to the assembly apparatus 26 (see FIG. 3). A large module 36 can comprise, for example, three individual modules 22. On connecting the individual modules 22 to form a large module 36, the individual modules 22 are displaced horizontally along the holding struts 34, 35 of the assembly apparatus 26 and thus horizontally relative to the assembly apparatus 26 until the individual modules 22 can be conveniently connected to one another to form a large module 36.

Further, in the cabin preassembly and testing station 24, a plurality of large modules 36 fastened to the assembly apparatus 26 are connected to one another to form a cabin structure 38 fastened to the assembly apparatus 26 (see FIG. 3). For this purpose, the large modules 36 are displaced horizontally relative to the assembly apparatus 26 until they have reached a desired position in which they can be simply and conveniently connected to one another to form the cabin structure 38. Alternatively to this, a plurality of individual modules 22 can also connected to one another directly to form a cabin structure 38 without being preassembled to form a large module 36 beforehand. Finally, it is conceivable to preassemble a plurality of individual modules 22 to form a large module 36 and subsequently extend the large module 36 by connection to further individual modules 22 to form a cabin structure 38.

As can best be seen from FIG. 2, the mounting system 10 comprises five further preassembly stations 40 to 48. In the preassembly station 40, personal service units and personal service channels are preassembled. The preassembly station 42 serves for the preassembly of individual parts of the ceiling covering, the aircraft on board cabin galley and the aircraft lavatories. Further, individual parts of the personal service units and the personal service channels are also preassembled in the preassembly station 42. The preassembly stations 44, 46 serve for the preassembly of aircraft galleys and lavatory modules. In the preassembly station 48, finally, crown area rack modules, i.e. luggage compartments provided for mounting in a central ceiling region of the aircraft cabin are preassembled.

The components preassembled in the preassembly stations, 40, 42 are integrated at least partly in the cabin preassembly and testing station 24 into individual modules 22 fastened to the assembly apparatus 26, into large modules 36 fastened to the assembly apparatus 26 or into a cabin structure 38 fastened to the assembly apparatus 26. Further, the individual modules 22, the large modules 36 and the cabin structure 38 are supplemented with electric lines, lines of an aircraft water supply system and lines of an aircraft air-conditioning system in the cabin preassembly and testing station 24.

Furthermore, testing of the individual modules 22, the large modules 36 and the cabin structure 38 takes place in the cabin preassembly and testing station 24. Tests carried out on the individual modules 22, the large modules 36 and the cabin structure 38 can comprise manual checks, visual checks, quality control measures, such as for example surface tests, but also functional tests of individual components, line tightness checks and tests on the electric lines and interfaces. These tests can also employ a simulation system which simulates conditions and/or events determined by the output of corresponding signals and checks whether the tested components, for example electric lines and interfaces, show the desired reaction to these conditions and/or events. The tests can be carried out already on the individual modules 22 or on the large modules 36, as required. However, particularly comprehensive tests are possible on the cabin structure 38, in particular if the cabin structure 38 has, moreover, already been supplemented with as many further interior components as possible, i.e. the subsequent aircraft cabin has been constructed as far as possible outside the aircraft.

The testing of the individual modules 22, the large modules 36 and the cabin structure 38 in the cabin preassembly and testing station 24 is advantageous insofar as the individual components of the individual modules 22, the large modules 36 and the cabin structure 38 are easily accessible in the cabin preassembly and testing station 24. In this way, the tests can be carried out in a relatively simple and time-saving manner. Furthermore, it is possible to replace components which have failed the test quickly and simply. As can best be seen in FIG. 3, the individual modules 22, the large modules 36 and the cabin structure 38 are fastened to the assembly apparatus 26 in the cabin preassembly and testing station 24 in a position which corresponds substantially to the position which these components assume in the mounted state in an aircraft. As a result, functional tests to be carried out on the individual modules 22, the large modules 36 and the cabin structure 38 can be carried out particularly realistically. Nevertheless, all the individual parts of these components are very easily accessible.

After completion of the tests in the cabin preassembly and testing station 24, the tested aircraft interior components are ready for final mounting. For this purpose, large modules 36 fastened to the assembly apparatus 26 in the cabin preassembly and testing station 24 are detached from the assembly apparatus 26 and loaded onto a transporting carriage 50. Large modules 36 fastened individually to the assembly apparatus 26 can be loaded directly onto the transporting carriage 50. If a plurality of large modules 36 are connected to form cabin structure 38, it is necessary to divide the cabin structure 38 into individual large modules 36 again before loading the large modules 36 onto the transporting carriage 50. The large modules 36 are transported by means of the transporting carriage 50 to an aircraft fuselage element 52. In a final-mounting and integrating station 54, the final mounting of the large modules 36 in the aircraft fuselage element 52 takes place.

As can best be seen in FIG. 3, the aircraft fuselage element 52 is in the form of a fuselage shell open at its end side. As a result, the large modules 36 can be transported into the aircraft fuselage element 52 in a simple manner. While being transported on the transporting carriage 50, the large modules 36 are held in a position on the transporting carriage 50 which corresponds substantially to the position which the large modules 36 assume in the final-mounted state in the aircraft fuselage element 52. As a result, complicated position changes of the large modules 36 on the final mounting in the aircraft fuselage element 52 can be avoided.

On loading the large modules 36 onto the transporting carriage 50, the transporting carriage 50 is brought into a suitable position in the cabin preassembly and testing station 24. The positioning of the transporting carriage 50 during this can be assisted by suitable guiding devices. Similarly, the transporting carriage 50 is positioned, on the final mounting of the large modules 36 in the aircraft fuselage element 52, such that the large modules 36 can be fastened to the structure of the aircraft fuselage element 52 while still in the state in which they are held on the transporting carriage 50. The transporting carriage 50 is equipped with corresponding devices for fine adjustment of the horizontal and the vertical position of a large module 36 held on the transporting carriage 50, so that the large module 36 can be optimally brought into its final-mounting position in the aircraft fuselage element 52 with the aid of the transporting carriage 50. Uncoupling of the large module 36 from the transporting carriage 50 takes place only when the large module 36 is at least provisionally fastened to the structure of the aircraft fuselage element 52.

Parts of the components preassembled in the preassembly stations 40, 42, and also the components preassembled in the preassembly stations 44, 46, 48, are directly transported to the aircraft fuselage element 52 and directly integrated into the aircraft fuselage element 52 in the final-mounting and integrating station 54.

The invention claimed is:

1. A method for mounting interior components in an aircraft, comprising:
   preassembling a first interior component,
   preassembling a second interior component,
   fastening at least one of the first and the second interior component to an assembly apparatus and connecting the first and the second interior component together to form an individual module,
   connecting together a plurality of individual modules fastened to the assembly apparatus to form a large module fastened to the assembly apparatus,
   connecting together a plurality of large modules fastened to the assembly apparatus to form a cabin structure fastened to the assembly apparatus,
   testing at least one of the cabin structure fastened to the assembly apparatus, one or more of the plurality of individual modules fastened to the assembly apparatus, and one or more of the plurality of large modules fastened to the assembly apparatus,
   after the testing, separating from one another each of the plurality of large modules that form the cabin structure, and
   individually, for each of the separated plurality of large modules,
      detaching the separated large module from the assembly apparatus,
      loading the detached large module onto a transporting carriage,
      transporting the loaded large module via the transporting carriage into a final-mounting position in an aircraft fuselage element, and
      final-mounting the transported large module in the aircraft fuselage element.

2. The method according to claim 1 wherein, on connecting together the plurality of individual modules fastened to the assembly apparatus to form the large module fastened to the assembly apparatus, at least one of the plurality of individual modules is displaced horizontally relative to the assembly apparatus.

3. The method according to claim 1 wherein further interior components are connected to at least one of one of the plurality of individual modules fastened to the assembly apparatus, one of the plurality of large modules fastened to the assembly apparatus and the cabin structure fastened to the assembly apparatus.

4. The method according to claim 1 wherein at least one of the individual module, the large module and the cabin structure is fastened to the assembly apparatus in a position which corresponds substantially to the position which the at least one of the individual module, the large module and the cabin structure assumes a final-mounted state in the aircraft fuselage element.

5. The method according to claim 1 wherein the large module is fastened to the structure of the aircraft fuselage element in the state in which it is held on the transporting carriage, and is uncoupled from the transporting carriage after it has been fastened to the structure of the aircraft fuselage element.

6. The method according to claim 5 wherein at least one of the horizontal and vertical position of the large module in the final-mounting position in the aircraft fuselage element is finely adjusted with the aid of the transporting carriage.

7. The method according to claim 1 wherein, on connecting together the plurality of large modules fastened to the assembly apparatus to form the cabin structure fastened to the assembly apparatus, at least one of the plurality of large modules is displaced horizontally relative to the assembly apparatus.

8. The method according to claim 3 wherein, on connecting together the plurality of large modules fastened to the assembly apparatus to form the cabin structure fastened to the assembly apparatus, at least one of the plurality of large modules is displaced horizontally relative to the assembly apparatus.

9. The method according to claim 1 wherein each of the separated plurality of large modules is transported to the aircraft fuselage element in a position which corresponds substantially to the position which the large module assumes in the final-mounted state in the aircraft fuselage element.

10. The method according to claim 4 wherein each of the separated plurality of large modules is transported to the aircraft fuselage element in a position which corresponds substantially to the position which the large module assumes in the final-mounted state in the aircraft fuselage element.

\* \* \* \* \*